(12) United States Patent
Heinloth

(10) Patent No.: US 6,257,807 B1
(45) Date of Patent: Jul. 10, 2001

(54) CUTTING INSERT FOR DRILLING AND DRILL

(75) Inventor: Markus Heinloth, Postbauer-Heng (DE)

(73) Assignee: Widia GmbH, Essen (DE)

( * ) Notice: Subject to any disclaimer, the term of this patent is extended or adjusted under 35 U.S.C. 154(b) by 0 days.

(21) Appl. No.: 09/242,706

(22) PCT Filed: Aug. 21, 1997

(86) PCT No.: PCT/DE97/01844

§ 371 Date: Apr. 5, 1999

§ 102(e) Date: Apr. 5, 1999

(87) PCT Pub. No.: WO98/07539

PCT Pub. Date: Feb. 26, 1998

(30) Foreign Application Priority Data

Aug. 23, 1996 (DE) .............................. 196 34 086

(51) Int. Cl.[7] ................................................. B23B 51/00
(52) U.S. Cl. ............................ 407/113; 407/114; 407/115
(58) Field of Search ..................... 407/113, 114, 407/115, 116

(56) References Cited

U.S. PATENT DOCUMENTS

| | | |
|---|---|---|
| 4,558,975 | 12/1985 | Hale . |
| 5,302,060 | 4/1994 | Nyström et al. . |
| 5,382,118 * | 1/1995 | Satran et al. .......................... 407/42 |
| 5,437,522 * | 8/1995 | Satran et al. .......................... 407/42 |
| 5,622,461 * | 4/1997 | Tukala et al. ........................ 408/224 |

FOREIGN PATENT DOCUMENTS

| | | |
|---|---|---|
| 27 51 255 A1 | 5/1978 | (DE) . |
| 27 30 418 B1 | 1/1979 | (DE) . |
| 34 19 350 A1 | 11/1985 | (DE) . |
| 92 09 093 U | 2/1993 | (DE) . |
| 41 34 335 A1 | 4/1993 | (DE) . |
| 44 16 040 A1 | 11/1995 | (DE) . |
| 44 37 689 A1 | 4/1996 | (DE) . |
| 0 088 505 A1 | 9/1983 | (EP) . |
| 0 112 136 A2 | 6/1984 | (EP) . |
| 0 054 913 B1 | 4/1985 | (EP) . |
| 0 181 844 A2 | 5/1986 | (EP) . |
| 0 181 844 B1 | 5/1986 | (EP) . |
| 0 775 547 A1 | 5/1997 | (EP) . |
| 2 387 723 | 11/1978 | (FR) . |
| 2116081 * | 9/1983 | (GB) .................................. 407/114 |
| 2 132 517 | 7/1984 | (GB) . |
| 2 190 863 | 12/1987 | (GB) . |
| WO 92/12817 | 8/1991 | (WO) . |
| WO 93/02824 | 2/1993 | (WO) . |
| WO 95/30505 | 11/1995 | (WO) . |

\* cited by examiner

*Primary Examiner*—Henry Tsai
(74) *Attorney, Agent, or Firm*—Herbert Dubno

(57) ABSTRACT

The invention concerns a cutting insert (10) for drilling. Said cutting insert (10) has a substantially rhomboid basic shape and its four cutting edges (20, 30), which each form cutting corners (15, 16), are broken, two first opposite cutting edges (20) each having cutting edge sections (21, 22) which form an obtuse angle ($\epsilon_1$) of between 140 and <180°. The two second opposite cutting edges (30) have a constriction, such that two cutting edge sections (31, 32) forming an angle ($\epsilon_2$) of >180° and 230° are produced. The invention further concerns a drill, wherein at least two of said cutting inserts are disposed on the front face of the shank, each disposed in a recess. The radially outer cutting insert has a concave active cutting edge and the radially inner cutting insert has a convex active cutting edge.

20 Claims, 11 Drawing Sheets

CUTTING INSERT FOR DRILLING AND DRILL

Figure 1:
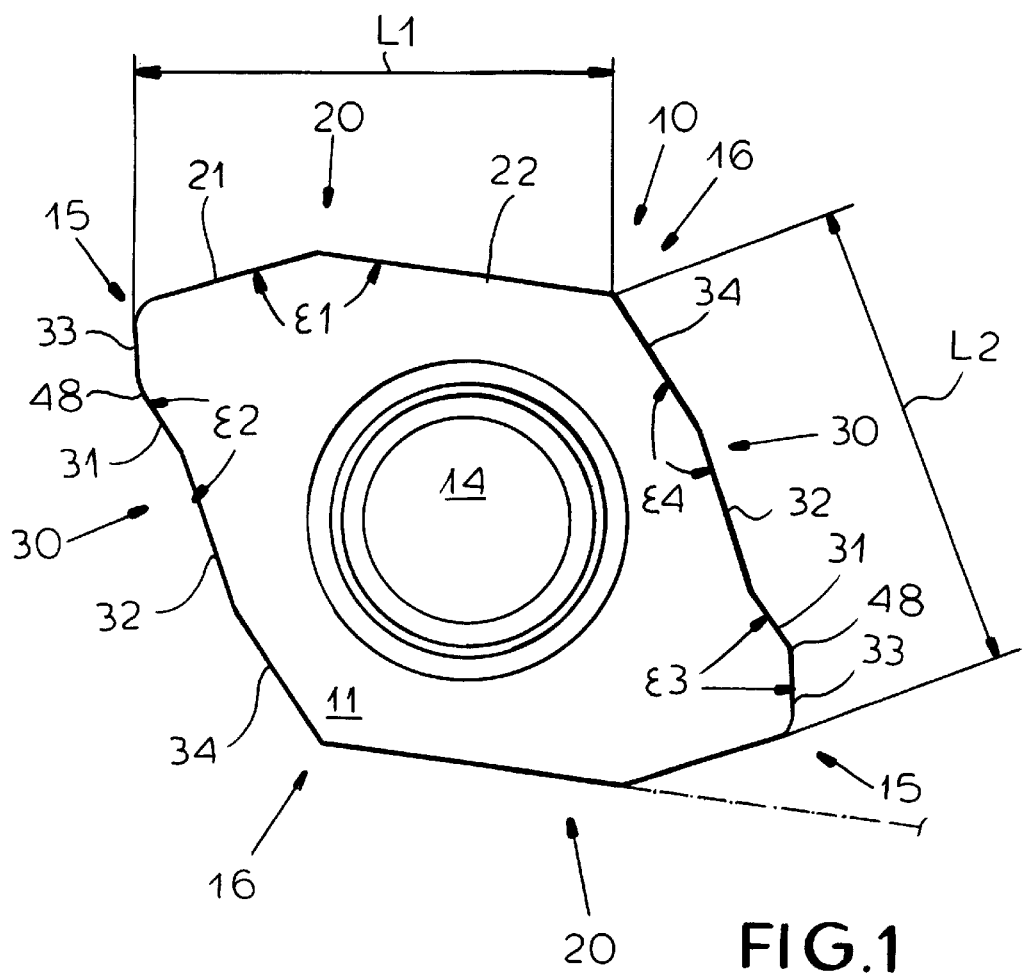

The invention relates a cutting insert for drilling with a substantially rhomboid basic shape, whose four cutting edges forming respectively four cutting corners are broken, whereby two first opposite cutting edges each have cutting edge segments forming an obtuse angle between 140° and <180°.

The invention relates further to a drill for drilling in solid materials, with a shank and at least two exchangeable cutting inserts having several cutting edges, arranged in a recess on the front face of the shank, whose work areas are adjacent to each other and overlap partially, whereby each cutting insert has cutting edges with mutually inclined cutting edge segments, which in the operational state are simultaneously effective, whereby the radial innermost cutting insert borders directly on the drill axis or slightly surpasses the same.

A cutting edge of the aforementioned kind is known for instance from EP 0 088 505 A1, This cutting insert has a rhomboid basic shape with pointed and dull cutting edges arranged opposite to each other in pairs, whereby each cutting edge is broken in a roof-shaped manner, so that the respective cutting edge segments with the approximately identical length of each cutting edge form an angle between 135° and 170°.

In the EP 0 088 505 a drill of the mentioned kind is also described, whose drill front face has a radially inner and a radially outer cutting insert of the mentioned king, whereby the connection line of two cutting corners of the cutting edge of each of the cutting inserts brought into contact with the workpiece is approximately perpendicular (vertical??) to the longitudinal axis of the drill.

The EP 0 181 844 B1 describes a cutting insert with a substantially rectangular contour, which has roof-shaped (convex) cutting edges only on the short sides. The two longer lateral surfaces, which are offset in the middle area with respect to the respective cutting corners, can not be used for machining. The construction of this cutting insert is such that two regular triangles with convexly broken sides are arranged in such an overlapping manner, that two corners of each of the triangles and one side of each of the triangles coincide with one cutting edge of the rectangular cutting insert and parts of the other side of the triangle coincide over a certain distance, in order to form adjoining cutting edges, so that both third corners of the triangles, which are arranged in the cutting insert, overlap over a distance which equals 0.5 to 0.7 times the length of the cutting insert between the breaking or bending points of the cutting edge, and that in the plane of the upper surface the shortest distance between the long lateral surfaces of the cutting insert is shorter than the distance between the ends of the respective cutting edges.

For drilling in solid material primarily hexagonal cutting plates are used, which essentially have a triangular basic shape and wherein each time two cutting edges forming an obtuse angle between 120° and 170° are involved in the chip-removal process. The use of such cutting plates is proposed for instance in DE 27 30 418 C2, whereby the cutting plates are each arranged in a recess of the drill shank, in such a manner that the bisecting line of the angle of the engaged cutting plates of each indexable insert is parallel to the drill axis or arranged at a slight inclination of maximum 2°. The disadvantage of this drill consists in that a force balancing of the drill shank is possible only when the respective two cutting edges in operation of a cutting plate are basically involved over their entire length, respectively when the work areas of two neighboring cutting plates do not overlap.

In the EP 0 054 913 B1 it is proposed to arrange the recesses for receiving the individual indexable inserts in such a way that the radial cutting force components of the cutting edges in operation for each individual indexable insert are balanced, in that the bisecting line of the angle of this cutting edge be inclined with respect to the parallel to the drill axis by an angle which depends on the effective length of the cutting edge in operation along a partial segment.

In order to balance the radial forces it has also been proposed in the DE 27 51 255 C2 that, for balancing the radial forces acting on the drill shank, the radial plane of the inner cutting insert be inclined rearwards, in a direction opposite to the rotation direction of the drill, at a certain angle against the peripherally arranged cutting insert. However by this the forces are merely directed parallelly, but not balanced, since the offset angle can not have any influence on the size of the radial forces and the cutting forces. Therefore the forces are preserved as a function of the cutting conditions and do not depend on the tool geometry.

The cutting inserts for a drill proposed by FR-A-2 387 723 have cutting edges with a notch in the center which should serve for interrupting, respectively limiting the effective cutting edge length. Depending on the position of the cutting insert with respect to the drill axis, only one of the two cutting edge halves is effectively engaged in cutting.

The WO 93/02824 describes a cutting insert with at least three cutting edges bordering the face and with cutting edges lying between two cutting corners, wherein at least one cutting edge has two projecting cutting points. The projecting cutting points can be formed either by the cutting corners of a concavely curved cutting edge itself, respectively one provided with a central constriction, or by projecting points, which extend beyond the roofed connection line of two cutting edges and which lie on one side of two middle cutting edge segments, which are arranged with respect to each other at an angle of >180° forming a constriction. In a corresponding variant the projecting points can also be realized in square or rectangular cutting inserts. From this reference it is also known to develop, in a broken cutting edge to be brought into contact with the workpiece, a prolongation beyond the cutting corner, which serves as a secondary cutter for the smoothing of the cut bore wall.

The EP 0 775 547 A1 (State of the Art according to Article 54 (3) EPU) describes a drill with cutting inserts with a polygonal basic shape with two first opposite cutting edges, each consisting of two cutting edge segments forming an obtuse angle, and two further cutting edges arranged on opposite sides, consisting of individual cutting edge segments, whereby one of this segments protrudes with respect to the adjacent cutting edge segment. The protruding cutting edge segment has a length which corresponds approximately to the half of the entire cutting edge. The cutting inserts are arranged on the drill front face in such a manner that the cutting edge with the protruding cutting edge segment comes to be radially outward and a roof-shaped cutting edge comes to be radially inward during the cutting operation, whereby the cutting edge of the radially inward cutting insert slightly surpasses the longitudinal axis of the drill.

Finally the DE 44 16 040 A1 describes a drill with two indexable inserts which are basically triangular and peripherally staggered at about 180°, with cutting edges whose rectilinear main cutting edges run at an acute setting angle radially outwards and rearwards with respect to the advance direction, and which during drilling both sweep at least approximately the same surface, whereby the cutting edges with inner corner areas or parts of the same extend up to the center of the tool or beyond it. This corner area has a rounding and an adjacent edge which is shorter in relation to respective straight main cutting edge, whereby the corner angle between the respective main cutting edge and the shorter straight edge is 90° or bigger. Due to the respective chamfered corner areas, during the drilling of a workpiece a pointed cone remains in the center.

It is the object of the present invention to create a cutting insert representing an alternative to the cutting insert mentioned in the introduction, which has four usable cutting edges which are suitable to produce the smallest possible chips and which take into account the different operational conditions in a drill, radially inward as well as radially outward. The thereby determined different shape of the cutting edge for the cutting inserts to be inserted radially inwards in a drill in contrast to the cutting inserts to be inserted radially outward in a drill should be realized in a single cutting insert, so that it is not necessary to use different cutting inserts during the cutting insert replacement in drills. Besides the unused cutting edge lying radially outwards in the shell area of the respective cutting insert has to be built so that it can be used after the engaged cutting edge is worn out, which presupposes a protection against wear in the previously described insert.

It is a further object of the invention to create a drill suitable for using a single cutting insert type.

This object is achieved due to the cutting insert according to claim 1.

This cutting insert has a substantially rhomboid basic shape with two pointed and two dull cutting corners, whereby two first opposite cutting edges are each roof-shaped, namely convex, while the two other opposite cutting edges have a constriction, i.e. are concave. This embodiment is achieved in that the convex cutting edges each have cutting edge segments which form an obtuse angle between 140° and <180°, while the two convex cutting edges each have cutting edge segments which form an angle between >180° and 230°. Compared to the known rhomboid cutting edge shape of the EP 0 088 505 A1, the cutting edge of the invention has the advantage that the cutting edge arranged radially outwards in the drill guided there along the bore wall, which according to the invention is concave, is extensively protected against wear due to the combination of the rhomboid and concave shapes, so that after the wear of the convex cutting edge, it can still be used radially inwards in the drill as an active concave cutting edge. Compared to the rectangular cutting inserts of EP 0 181 844 B1, respectively a corresponding shape according to WO 93/02824, which have only two usable cutting edges, the number of usable cutting edges can be increased to four.

Further developments of the cutting insert of the invention are described in claims 2 to 17.

So for instance in the area of the pointed cutting corners of the rhomboid basic shape, the second cutting edge adjoining the first convex cutting edge beyond the cutting corner is provided with a cutting edge segment which advantageously forms an angle of >90° with the first cutting edge, and an angle ranging between 140° and 170° with the adjoining cutting edge segment of the second concave cutting edge. If in the area of the obtuse-angled cutting corners of the rhomboid basic shape, the second cutting edge adjoining the first convex cutting edge beyond the cutting corner has a cutting edge segment forming an angle between 150° and 170° with the adjoining cutting edge segment of the concave cutting edge, then due to this further convex flattening it is possible in addition to achieve a better intersection of the radially inwards arranged plate with a concave cutting edge and the convex cutting edge of the outer plate, The thereby created smooth transition minimizes the wear, since no sharp corners protrude.

Preferably a notch (retraction) is provided between the pointed cutting corner and the first cutting edge segment having a constriction, which separates the cutting corner and the cutting edge segment in such a manner that, during use for chip removal the roof-shaped cutting edge of the cutting edge segment does not have any contact with the workpiece. This insures that wear during the use of the roof-shaped cutting edge can not "expand" into the passive cutting edge. Further during the use of this cutting plate in a drill, sufficient clearance is left in the outer and inner areas of each of the cutting inserts. Besides during drilling the cutting pressure is reduced, when the respective cutting edge is arranged with the notch at the height of the longitudinal drill axis. This reduces the danger of breakage at the cutting edge.

Advantageously the notch, which serves as a physical separation means of two adjacent cutting edges, has a depths between 0.1 mm and 2 mm. The notch itself is designed without pointed edges as a retraction basically shaped as a circle segment, preferably with a concavity having a radius between 0.1 mm and 0.8 mm. In the rake face area located underneath the notch there is a corresponding recess, whose rake angle ranges between 5° and 20°. The rake angle of the retraction in the rake surface can however vary within the same ranges as the rake angle for the entire indexable insert. The rake-face recess underneath the notch tapers off with increasing distance from face plane in width, and ends in the upper part of the rake face.

The ratio between the length of the convex cutting edge to the length of the concave cutting edge can be even (1:1), but can also be different and amount up to 1.2:1. Advantageously the two cutting edge segments forming the convex cutting edge are basically of equal length. Also the rectilinear cutting edge segments, which border on each other by forming a constriction, can be of equal length or consist of a longer and a shorter cutting edge segment, whose length ratio equals 1 to 1:4. Hereby the respective longer cutting edge segment of the concave cutting edge adjoins the previously mentioned cutting edge segment, whereby the distance (radial in the drill) of the cutting edge segment of the concave cutting edge, which lies further away from the secondary cutting edge, increases.

Preferably the outer cutting edge segments of the concave cutting edge which adjoin a respective cutting corner form a ratio of 1 to 1:4 and according to a further embodiment of the invention, the sum (of the lengths) of the two middle cutting edge segments is bigger than in the outer ones. The transition area from the respective outer cutting edge segment to the middle cutting edge segment is rounded off at a radius of 1 to 2 mm.

For the protection of the cutting edge, furthermore the cutting edges and the transition areas between two neighboring cutting edge segments bordering on each other by forming an acute or an obtuse angle are rounded, particularly with a radius between 1 and 2 mm. This also includes such cutting inserts wherein the convex and concave cutting edges, respectively convex and concave cutting edge segments, are not rectilinear, but are slightly curved.

The angle characterizing the roof shape of the convex cutting edge is similar to the complementary angle of the respective angle of the concave cutting edge (preferably between 150° and 180°).

Preferably the face is larger than the thereto parallel contact surface of the cutting insert, so that a positive cutting geometry exists. Further the rake face can be composed by partial surfaces, which border on each other at an angle of 150° to 180°, whereby the rake angle of the upper rake face segment bordering on the cutting edge is smaller than the rake angle of the rake face segment bordering on the support surface. The common border of both rake face segments can run either parallelly with respect to the respective cutting edge or inclined at an angle thereto. Finally the face can have chip forming elements, such as chip grooves (which run parallelly along each of the cutting edges), raised portions and/or chip forming depressions in a manner which is basically known to the art.

The further drill tool according to the invention is described in claim 18 and according to the invention is characterized in that the radial outer cutting insert has a convex active cutting edge and the radially inner cutting insert has a concave active cutting edge. Advantageously the cutting edge segment bordering on the active convex cutting edge of the radially outer cutting insert runs parallelly to the longitudinal axis of the drill or is slightly inclined thereto at an angle of 10°. The radially inward cutting insert is arranged so that the convex flattening of the adjoining concave cutting edge, which is the short part at the end of the concave cutting edge opposite to the secondary cutting edge, is inserted in the intersection area between the outer plate and the inner plate.

Advantageously the previously described cutting insert according to claim 3 is used, whereby the radially innermost cutting insert is arranged so that the mentioned notch lies in the area of the longitudinal axis of the drill. Since in this point the rotational speed is 0 or very low, the cutting pressure is avoided due to the notch. In the radially outwards arranged cutting insert, wherein the roof-shaped cutting edge serves as the active cutting edge, the mentioned notch separates this active cutting edge including the cutting corner from the (passive) cutting edge facing the bore wall of the workpiece, so that it is protected during the drill advance.

In order to improve in the drill the stability of the wedge formed between the face and the rake face, particularly in order to keep as low as possible the pressure exerted during drilling on the rake face, especially in the middle area of the drill with inserted cutting plates, it is further proposed that at least the area of the rake face adjoining the active cutting edge of a cutting insert be formed by a family of straight lines perpendicular to the cutting edge, each one of them being inclined at an effective positive (rake) angle, with respect to the a three-dimensional curve laid out as an inclined straight line respective to the drill advance. Due to this measure, each rake face of the frontally arranged cutting inserts of a drill, along the entire cutting edge, particularly in the area of the cutting edge points, is adjusted to the eroded surface resulting from the drill rotation and its axial advance, namely the bore base, so that at each location a positive rake angle results, whereby the drill "is free during drilling and does not rest over the middle area". Preferably this effective positive rake angle is <15°, particularly ranges between 5° and 9°.

The determination of the absolute rake angle of the rake face areas, which adjoin the active cutting edge of a cutting insert in a drill is performed as follows:

For each point of an active cutting edge of a frontally arranged cutting insert, the helical three-dimensional curve for the strictly preselected axial drill advance is established, subsequently developed (in one plane) into a straight line, relative to a plane perpendicular to the drill advance. Through respective rotations of this straight line about the desired rake angle, which the rake surface adjoining the active cutting edge is supposed to have with respect to the bore base, in connection with border a point on the active cutting edge, the respective local course of the rake face is obtained. The family of the respective rake face courses forms then the entire rake face adjoining the active cutting edge, respectively a part thereof.

The following considerations serve for further clarification:

Each point of an active cutting edge of a frontally arranged cutting insert describes during the drill advance in a centered drill direction a spiral-shaped (helical) curve, whereby the drill base results from the total of these curves. If each of these helical curves is rotated about a desired rake angle, which the rake surface adjoining the cutting edge should have, a further group of helical three-dimensional curves results, which in opposition to the respective nonrotated helical curves, allow for a distance, respectively a rake angle between the drill base. Since the radius of a point on the active cutting edge when viewed from above increases outwards seen from the bore center, during the development of the respective helical three-dimensional curves straight lines of various length result, which also explains why the respective rake angles along the cutting edge are of different size. The family of spirals rotated about the desired rake angle serves thus as a support or enveloping curve for the rake face to be created.

A spiral shape deviating from the helical shape results when the drill is used not only for the indicated nominal diameter, but also for drilling slightly larger or smaller bore diameters, whereby the drill axis is deflected from the bore axis by a correspondingly minimal measure e.g. of a few $\frac{1}{10}$ mm. In order to be able to set an effective rake angle even in this case, the effective rake angle loss, which results from the spiral path instead of the helical path of a cutting edge point, has to be compensated by a corresponding compression of the helical shape about a circular path into a spiral.

The described method can be applied to any axial advance, respectively any desired actual rake angle, whereby the respectively selected advance has to be considered as the maximum acceptable advance for the drill.

Embodiment examples of the invention are represented in the drawing. It shows:

FIG. 1 a top view of a cutting insert of the invention

Figure 2:
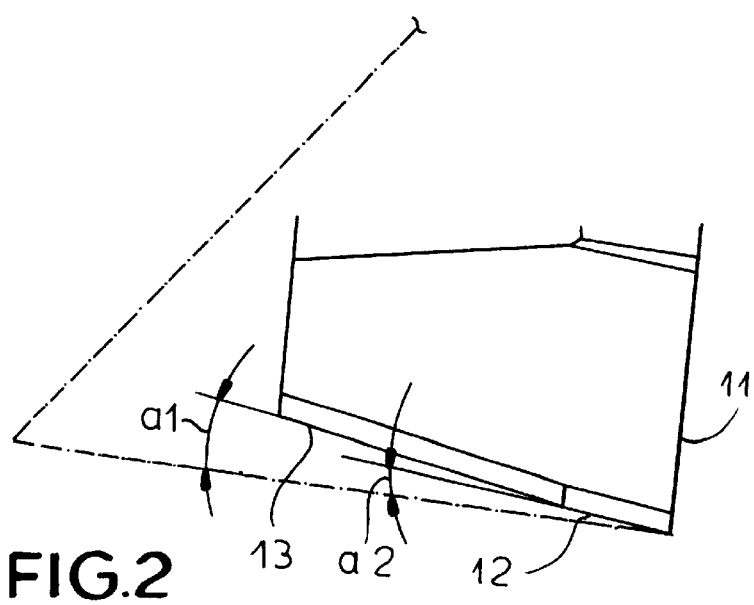
Figure 3:
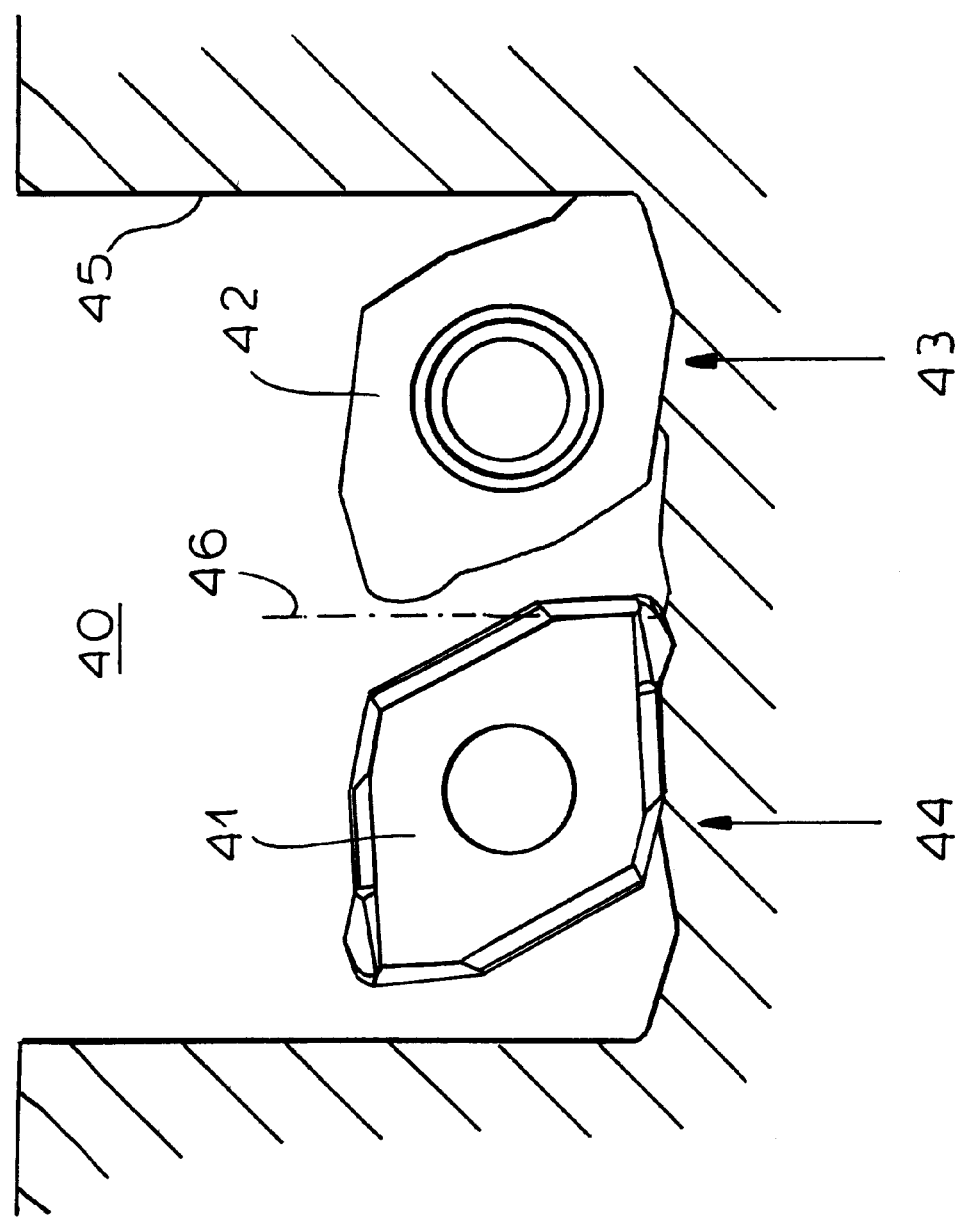
Figure 5:
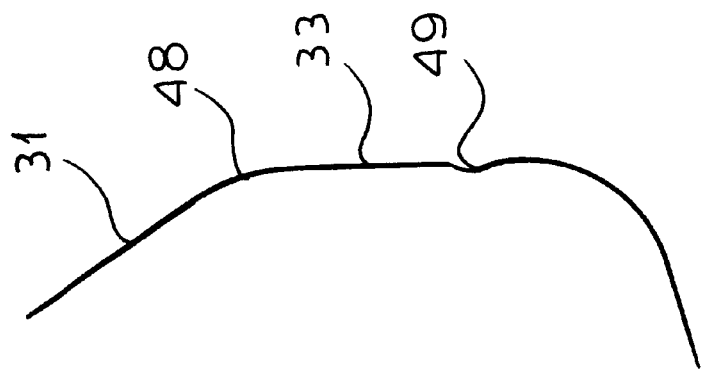
Figure 4:
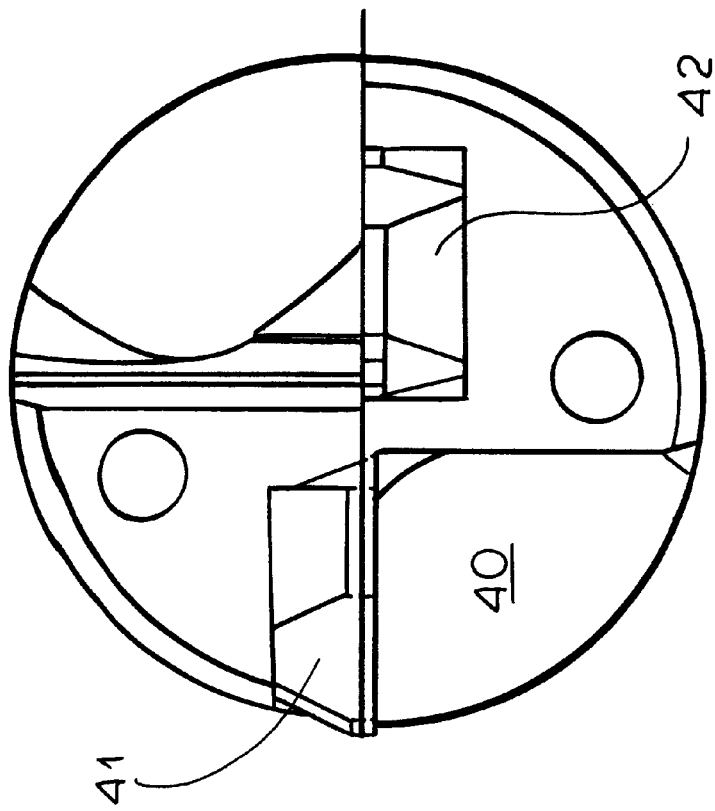
Figure 6:
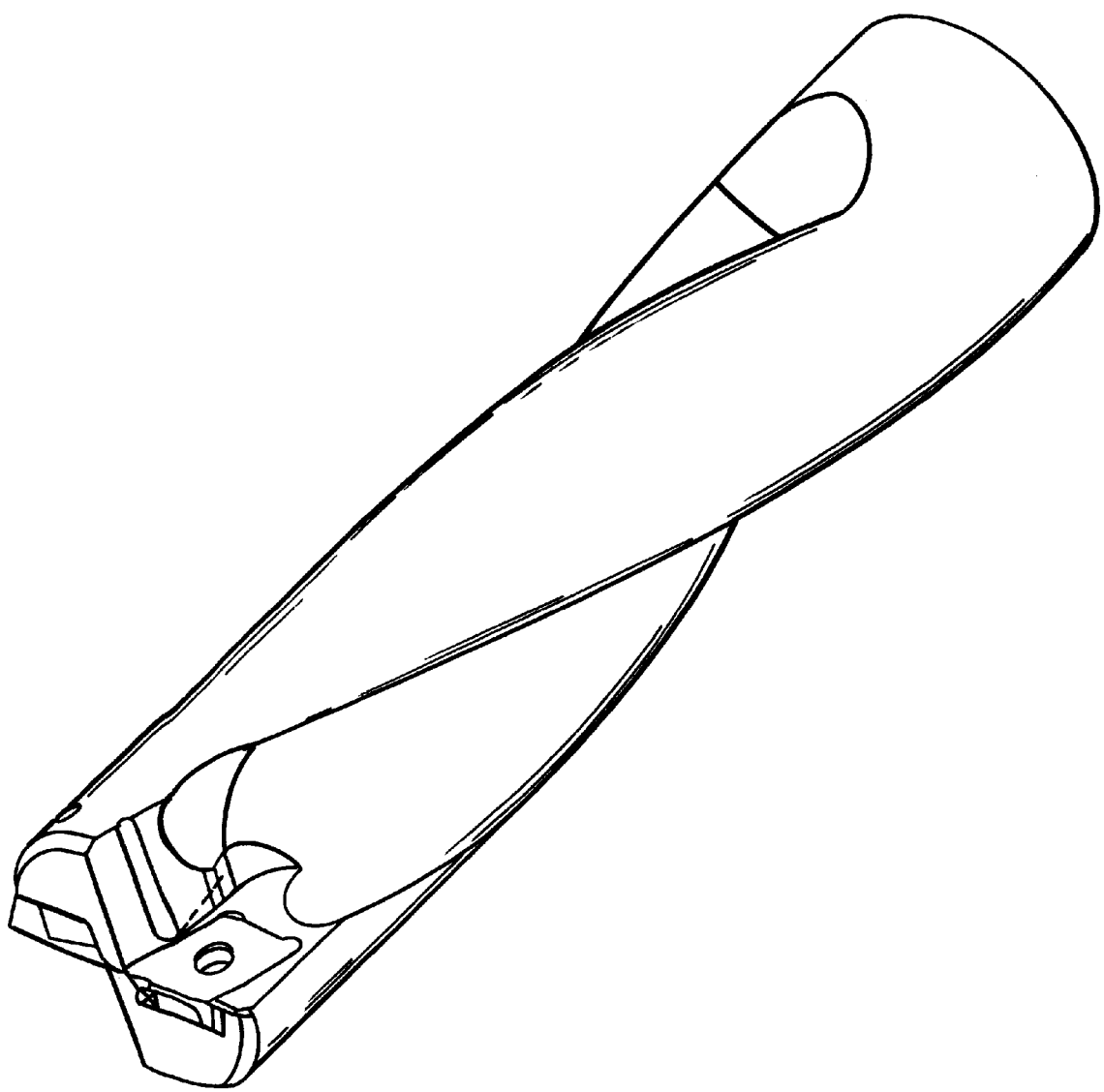
Figure 8:
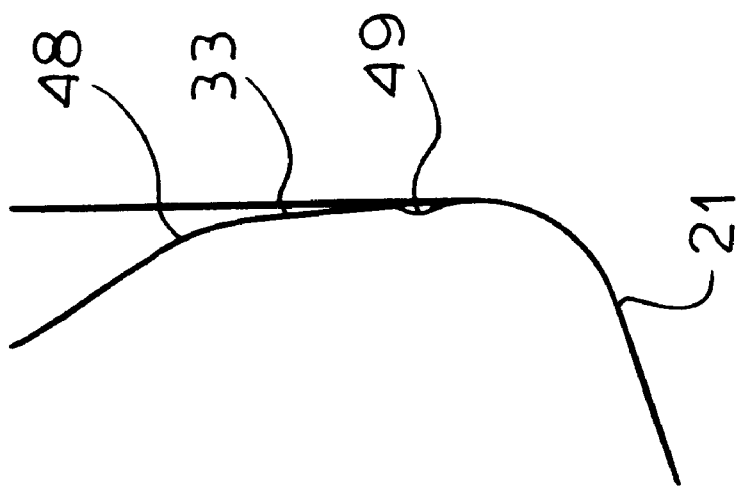
Figure 7:
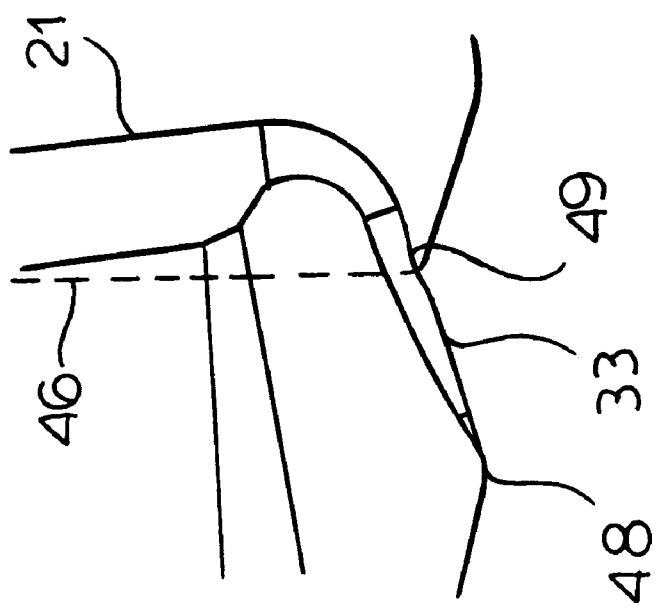
Figure 9:
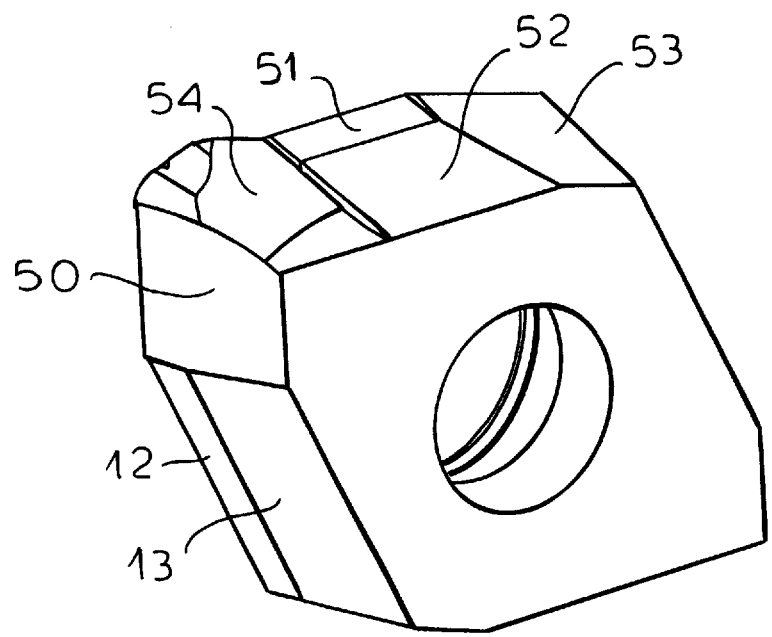
Figure 10:
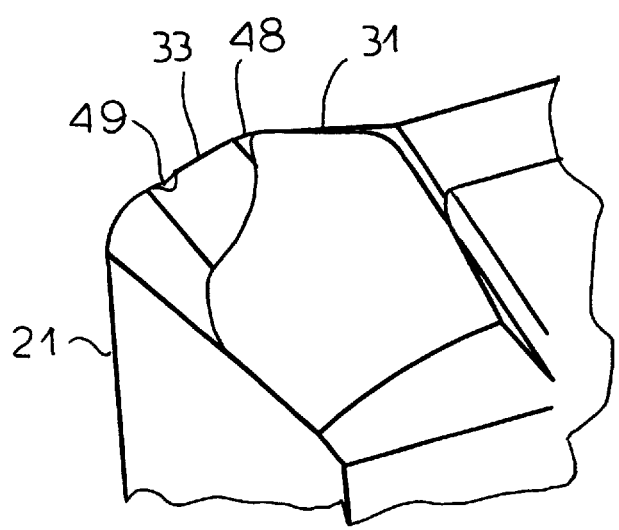
Figure 11:
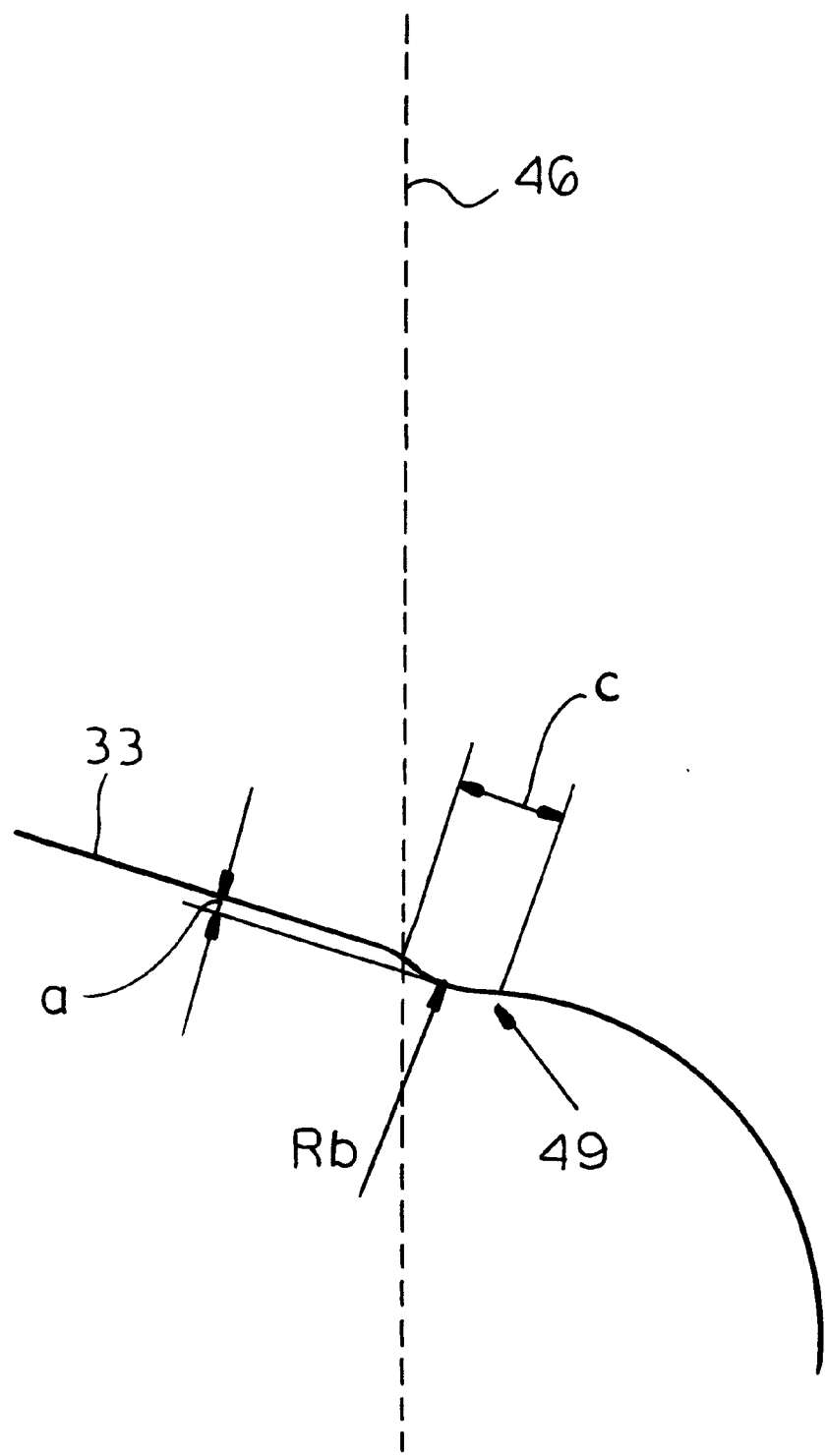
Figure 12:
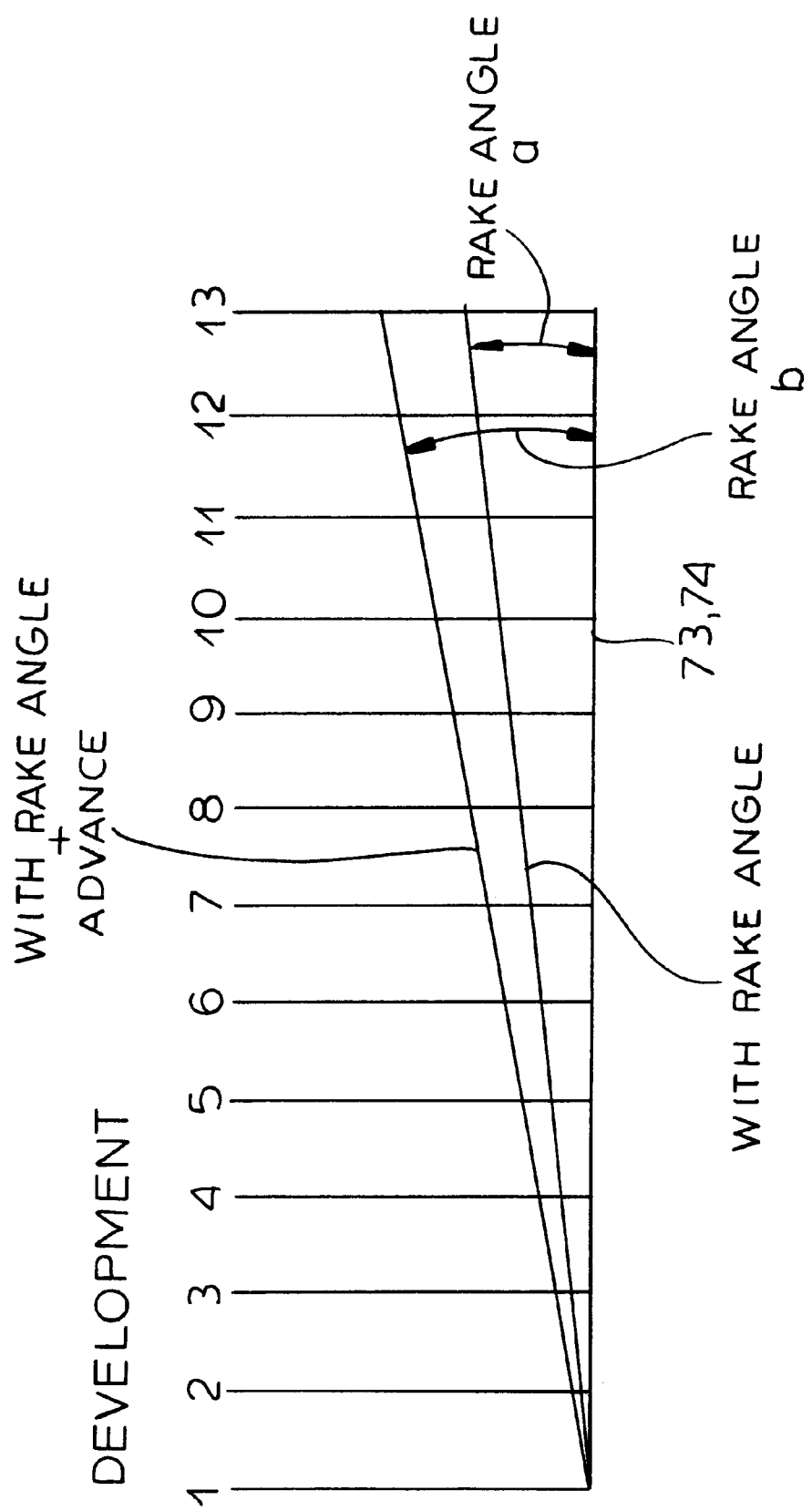
Figure 14:
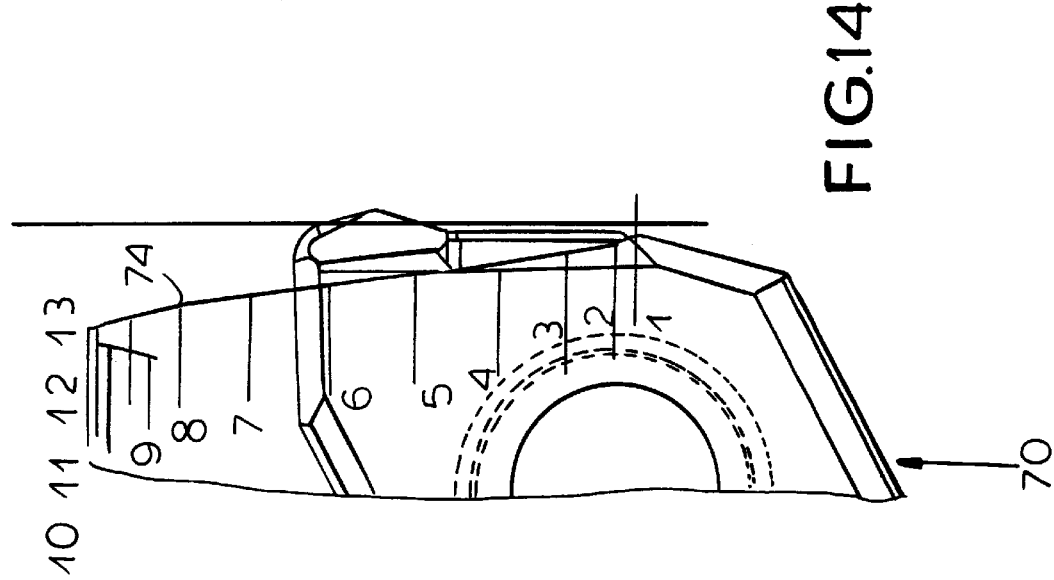
Figure 13:
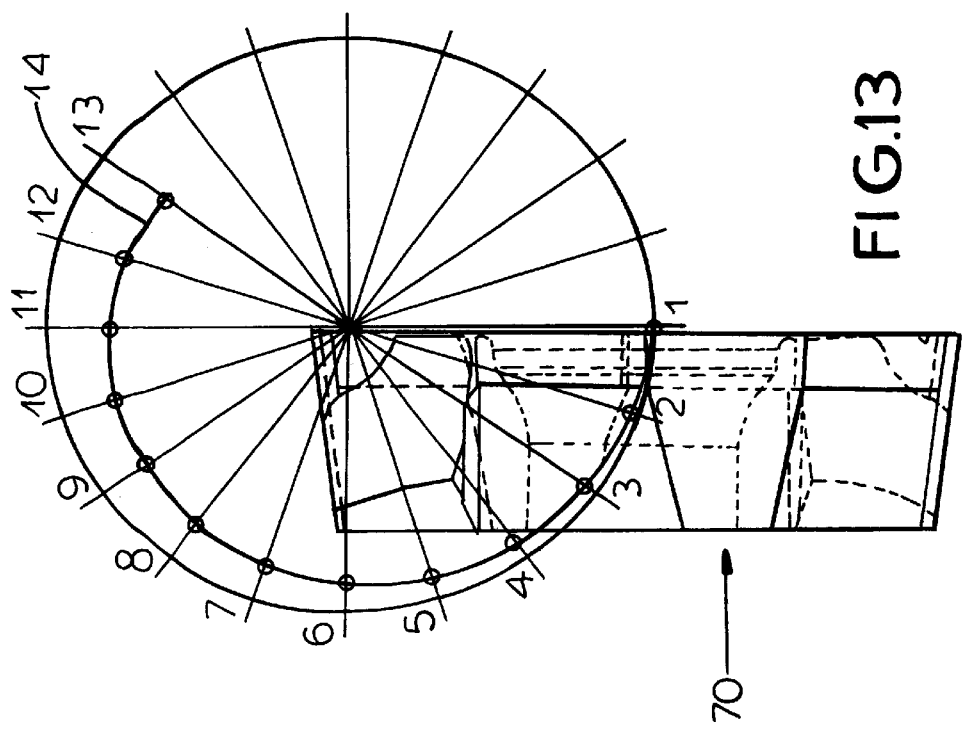
Figure 15:
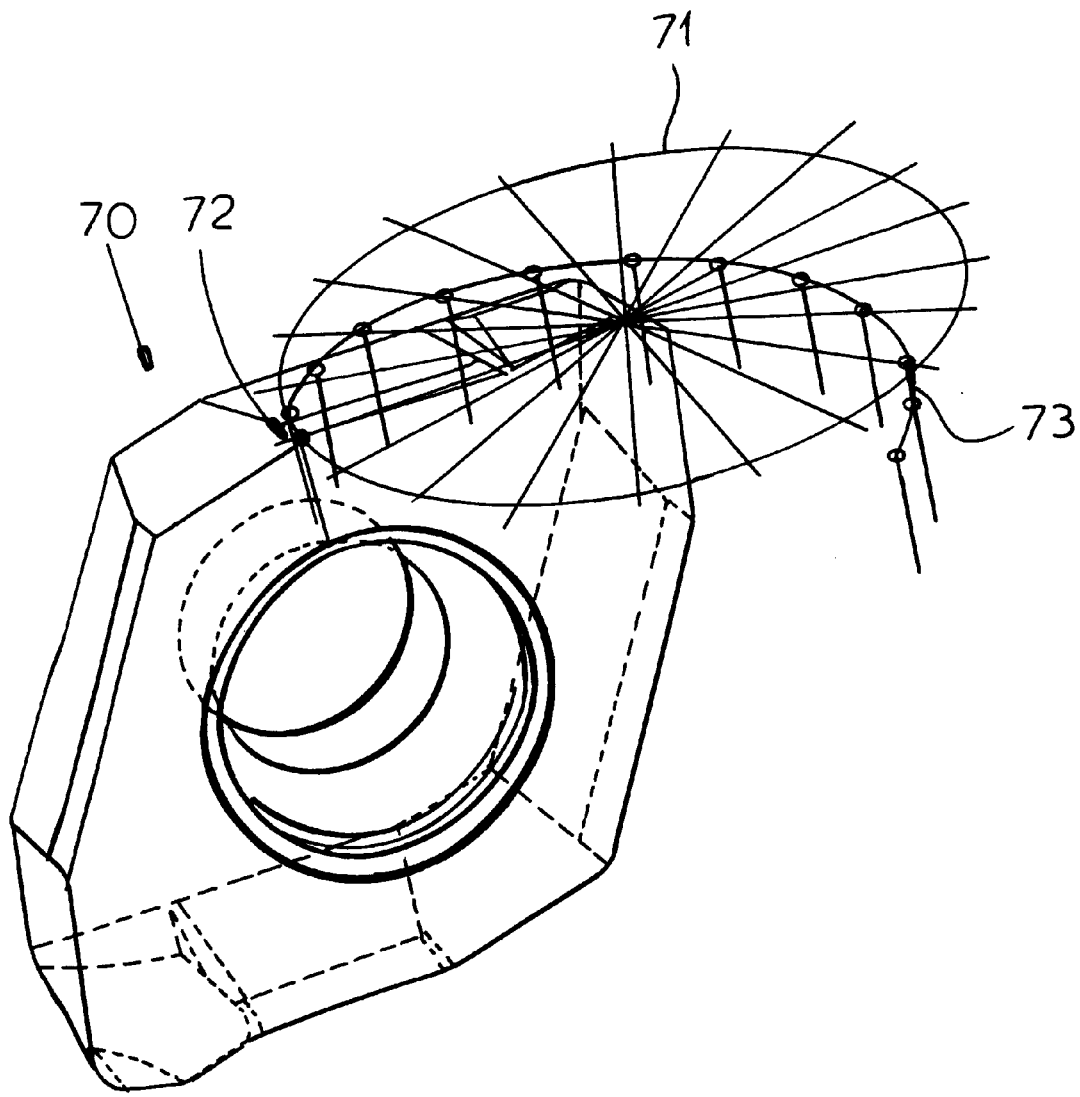
Figure 16:
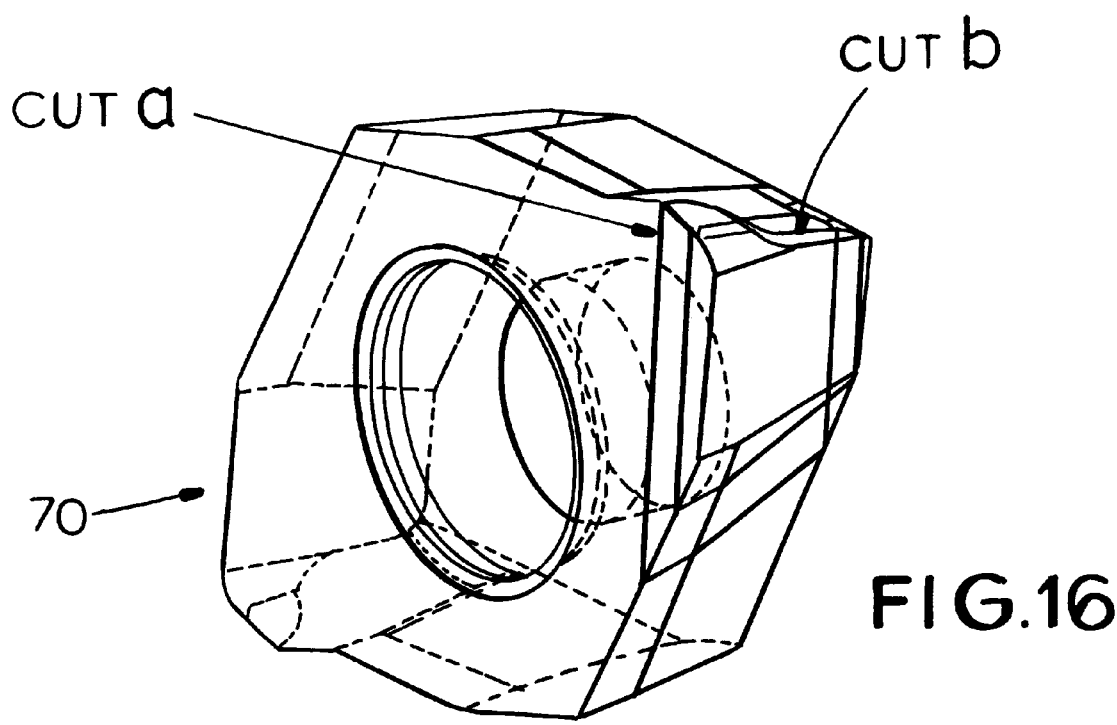
Figure 17:
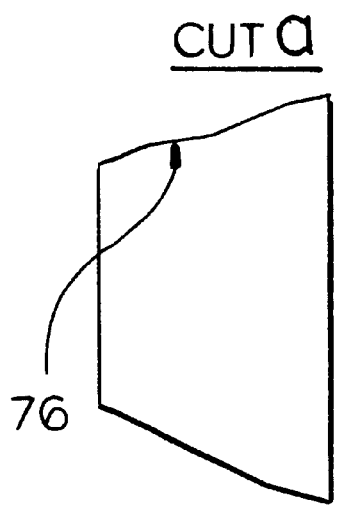
Figure 18:
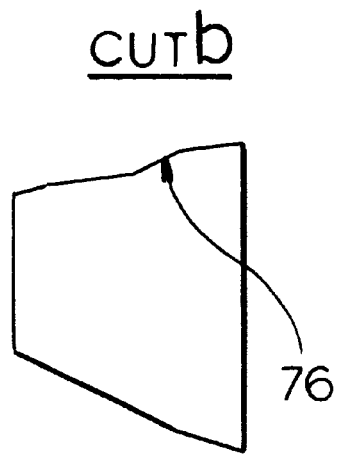

FIG. 2 a partially sectioned view showing the positive cutting geometry,

FIG. 3 a sectional view of a drill according to the invention with two cutting inserts during operation, FIG. 4 a frontal view of the drill according to FIG. 3, FIG. 5 a detailed view of the pointed cutting corner (15), FIG. 6 a three-dimensional view of the drill, FIGS. 7, 8 each an enlarged detailed view of the acute-angle corner areas of a cutting insert in different positions in the drill, FIG. 9 a perspective view of the of the cutting insert according to FIG. 1, FIG. 10 an enlarged partial representation of an acute-angle cutting corner according to FIG. 9, FIG. 11 an enlarged diagrammatic sketch of the position of the notch of a cutting edge separation with respect to the longitudinal drill axis, FIG. 12 three-dimensional curves developed in one plane, which resulted under the sole consideration of the rake angle and under common consideration of the sum of the rake angle and the advance of the tool, FIG. 13 a top view on a spiral-shaped three-dimensional curve, which traverses a cutting edge point at a slightly eccentrically deviated drill axis, FIGS. 14, 15 each a view of the spiral-shaped three-dimensional curve according to FIG. 13 deviated by 90°, FIG. 16 an example of a cutting insert in schematic representation, FIGS. 17, 18 each a section in the cutting planes a and b.

The cutting insert 1 represented in FIG. 1 has a substantially rhomboid basic shape with a face 11, a bottom surface as well as rake faces lying therebetween, each being angled to rake face segments 12 and 13 (see also FIG. 2). Further a hole 14 is provided for the fastening the cutting insert. The cutting insert has a positive geometry of its cutting edges, in the present case forming a rake angle $\alpha_1$ respectively $\alpha_2$ for the respective rake face segments 12 and 13. The face is formed by two opposite concave [sic] cutting edges 20, as well as convex [sic] cutting edges 30. The rectilinear cutting edge segments 21 and 22 of the convex cutting edge 20 form an obtuse angle $\epsilon_1$ of (preferably 150° to 180°). The concave cutting edge 30 is basically formed by cutting edge segments 31, 32 and 34, the cutting edge segments 31 and 32 enclose an angle $\epsilon_2$ of about 200°, i.e. the complementary angle 360°—$\epsilon_2$ corresponds approximately to the angle $\epsilon_1$. However also angles $\epsilon_1$ of different magnitude and 360°—$\epsilon_2$ can be selected.

Adjoining the cutting edge 15 corresponding to the acute-angle corner of the rhomboid basic shape, the cutting edge 30 has a cutting edge segment 33, which forms an angle $\epsilon_3$ of 145° with the cutting edge segment 31 adjoining here. At the other end of the cutting edge a further flattening 34 is arranged, which forms an angle $\epsilon_4$ of 165° with the adjoining cutting edge segment 32. The cutting edge segments 21, 22 are of equal length, while the cutting edge segment 32 has approximately twice up to four times the double length of the cutting edge segment 31. The segment 33 of the concave main cutting edge is relatively short compared to the segment 34 and forms with the segment 31 a radius 48 of R=1.5 mm. The segment 34 is approximately half the length of segment 32.

The connection line of the cutting corners 15 and 16 in the area of the cutting edge 20 is at least as big as the respective connection line in the area of the concave cutting edge 30, preferably the represented length $l_1$ is bigger than $l_2$, whereby $l_1/l_2$ ranges between 1 and 1.2. The cutting corners 15, 16, as well as the transition area between the cutting edge segments 21, 22; 31, 32; 32 [sic], 34 are each rounded.

The drill basically known to the state of the art has a shaft 40 with several replaceable cutting inserts 41, 42 each arranged in a recess and having several cutting edges, the first cutting insert 41 of which is arranged radially outwards and the second cutting insert 42 is arranged radially inwards. The cutting inserts, respectively the correspondingly shaped recesses correspond in their geometry to the aforedescribed cutting insert, whereby the active cutting edge 43 of the cutting insert 42 is convex and the active cutting edge 44 of the cutting insert 41 is concave. Due to the cutting edge segments 31, 33 and the radius 48 during drilling a leading drill groove is created. The division of the active cutting edges 43, 44 in several partial areas creates the advantage that during drilling narrow, short chips are produced, whose evacuation is facilitated.

FIGS. 7 and 8 clarify the action of the notch (retraction) 49, whose position and further development can also be seen from FIGS. 9 to 11. The notch 49 lies in the innermost cutting insert approximately at the height of the drill axis 46, whereby the preferred position of the notch is over the middle area bordering on the drill axis 46 (see FIG. 11). This insures that the cutting insert is sufficiently free in every point at the maximum indicated advance. The respective advance ranges for drilling diameters between 11 mm up to 25 mm lie between $f_z$=0.06 to 0.25, for drilling diameters between 25 mm up to 55 mm they lie between 0.12 and 0.35. The retraction 49 has to be shaped and dimensioned so that the cutting insert can be free at any possible advance and the maximum large surface 54 (see FIG. 9) results. This surface 54 has to be stable. The notch ends its run at the rake face.

The configuration of the rake face depending on the insertion position of the cutting inserts, particularly in the middle area of the drill, has to be determined by considering that each point on the cutting edge, at a certain distance to the drill axis 46 and its pertaining rake face line, lies during the maximum indicated drill advance in such a manner with respect to the a point on the same cutting insert with the same distance on the mirrored side of the drill axis, that the drill is free during drilling and does not sit over the middle area. For this purpose serve the following considerations which are explained with the aid of FIGS. 12 to 18:

Each point of an actively cutting edge of a cutting insert on a rotating drill, which does not lie in the center of the bore, respectively on the longitudinal drill axis, describes during on drill rotation without advance a path which lies in one plane, such as can be seen in FIG. 15 from the cutting insert 70 and from the plane defined by the circle 71, which passes through the point 72 of the cutting edge. If the advance of the drill, respectively of the cutting insert during drilling is taken into consideration, a helical three-dimensional curve 73 results, which in the case of a precisely centered drill, i.e. while drilling a nominal diameter, describes a helical path. Deviation from the helical shape occur then, when for drilling of smaller or larger diameters than the nominal diameter, the drill is deviated from the bore axis by several tenths of a millimeter. The respective spiral shape as a projection of the helix in one plane can be seen from FIG. 14 and is marked with the reference numeral 74. The developed three-dimensional curves 73, 74 correspond to the horizontally represented ground line in FIG. 12. By contrast the point lying on a perpendicular to the cutting edge of the rake face located under the cutting edge, which also follows a corresponding three-dimensional curve, is inclined by the rake angle a. However this rake angle setting is maintained only as long as no drill advance occurs. In order to maintain an effective rake angle, the "rake angle loss" resulting from the drill advance has to be compensated, which is made clear by the straight line 75, which indicates the objective rake angle b in relation to the resting cutting insert for each rake angle below a cutting edge point. During the drill advance, in this manner it is possible to establish an effective rake angle of the desired kind in relation to the advance, independently from the contour of the rake face of the cutting insert 70. The sections A and B obtained from FIG. 5 show a variety of contours 76 of the rake face underneath the cutting edge point 72.

Furthermore it is possible to axially rotate the cutting inserts in the represented and previously described drill, i.e. to turn them by an angle between preferably 0° to 6° with respect to the drill axis, whereby the rake angle can be correspondingly increased.

Possible is also a radial rotation of the cutting insert, particularly of the radially outward cutting insert, preferably by up to 30°. In a cutting insert radially rotated in this manner around the drilling center, correspondingly enlarged chip chambers result. It is also possible to tilt a cutting insert, e.g. the radially outward one, about the radially outward cutting edge point, whereby the tilt angle can be selected between −10° up to 10°. Also rotations of 2° up to 12° about an axis perpendicular to the drill axis in the radially outward plate or of up to 10° in the radially inward plate are possible, just like an innermost cutting insert, which has an axial projection with respect to the radially outward cutting insert (or the remaining cutting inserts), leads during drilling. The respective projection length lies preferably under 2 mm.

All the aforementioned tilting of the cutting inserts or their geometric arrangement can be combined as desired.

Advantageously during drilling the cutting insert shown in FIG. 1 should be used, whereby all four cutting edges are in action. This however, in the case of materials which are hard to be machined, should not exclude the use of various geometries, rake angles, material compositions and coating of the cutting inserts in the selection of the inwardly arranged cutting inserts by comparison to the outwardly arranged cutting inserts. Therefore it is also possible to use different cutting inserts inside and outside, in order to improve the tool life and the chip removal.

Besides for the drill construction, as well as the arrangement of the cutting inserts, references is made to the previously described configurations, which can be realized in a corresponding manner also with the cutting insert of the invention.

What is claimed is:

1. A cutting insert for drilling, comprising a generally rhomboidal body having a cutting face on one side of said body, a support face on an opposite side of said body, a pair of opposing jutting cutting edges and a pair of opposing indented cutting edges bounding said cutting face and defining two diagonally opposite generally acute-angle cutting corners and two diagonally opposite generally obtuse-angle cutting corners, and respective rake faces extending between said cutting edges and said support face, said jutting cutting edges each being formed by two first cutting edge segments defining an outwardly projecting V shape and including an obtuse angle $\epsilon_1$ from 140° to less than 180°, said indented cutting edges each being formed by a plurality of second cutting edge segments including two inwardly converging segments defining an inwardly directed V-shaped indentation and including an angle $\epsilon_2$ from greater than 180° to 230°.

2. The cutting insert defined in claim 1 wherein, in a region of each of said acute-angle cutting corners, the respective indented cutting edge is formed with a respective second cutting edge segment defining an angle greater than 90° with a respective first cutting edge segment of a respective jutting cutting edge, and defining an angle $\epsilon_3$ of 140° to 175° with an adjacent second cutting edge segment.

3. The cutting insert defined in claim 2 further comprising a notch formed in each of said indented cutting edges adjacent the respective acute-angle cutting corner.

4. The cutting insert defined in claim 3 wherein said notch has a depth of 0.01 mm to 0.3 mm and a width of 0.1 mm to 2 mm.

5. The cutting insert defined in claim 4 wherein said notch is circularly concave with a radius of curvature of 0.1 mm to 0.8 mm.

6. The cutting insert defined in claim 3 wherein said notch extends into a respective one of said rake faces disposed between the respective indented edge and said support face with a rake angle between 5° and 20°.

7. The cutting insert defined in claim 6 wherein said notch tapers off into the respective rake face.

8. The cutting insert defined in claim 3 wherein said indented cutting edges have, adjacent the respective obtuse-angle cutting corner, a respective second cutting edge segment forming an angle $\epsilon_4$ of 150° to 170° with a respective first cutting edge segment of the respective jutting cutting edge.

9. The cutting insert defined in claim 3 wherein a length of the jutting cutting edge to a length of the indented cutting edge is in a ratio between 1:1 and 1.2:1.

10. The cutting insert defined in claim 3 wherein said first cutting edge segments are substantially of the same length.

11. The cutting insert defined in claim 3 wherein the second cutting edge segments forming said inwardly directed V-shaped indentation are in a length ratio between 1:1 and 1:4.

12. The cutting insert defined in claim 3 wherein the second cutting edge segments adjoining a respective acute angle corner is shorter than the second cutting edge segment adjoining a respective obtuse-angle cutting corner and forms with an adjacent cutting edge segment a radius of 1.0 to 2.0 mm.

13. The cutting insert defined in claim 3 wherein the cutting corners and vertexes of the projecting v-shaped and the v-shaped indentation are rounded with radii between 0.2 and 1.2 mm.

14. The cutting insert defined in claim 3 wherein angle $\epsilon_1$ is substantially equal to 360° angle $\epsilon_2$.

15. The cutting insert defined in claim 3 wherein said cutting face is larger than said support face.

16. The cutting insert defined in claim 3 wherein said of said rake faces is formed by partial faces adjoining one another at an angle of 150° to 180°, a partial face adjoining the respective cutting edge having a smaller rake angle in a rake angle of a partial face adjoining the support surface.

17. A drill for drilling solid materials comprising a shaft and at least two replaceable cutting inserts mounted on said shaft, each of said cutting inserts comprising:

generally rhomboidal body having a cutting face on one side of said body, a support face on an opposite side of said body, a pair of opposing jutting cutting edges and a pair of opposing indented cutting edges bounding said cutting face and defining two diagonally opposite generally acute-angle cutting corners and two diagonally opposite generally obtuse-angle cutting corners, and respective rake faces extending between said cutting edges and said support face, said jutting cutting edges each being formed by two first cutting edge segments defining an outwardly projecting V shape and including an obtuse angle $\epsilon_1$ from 140° to less than 180°, said indented cutting edges each being formed by a plurality of second cutting edge segments including two inwardly converging segments defining an inwardly directed V-shaped indentation and including an angle $\epsilon_2$ from greater than 180° to 230°, said cutting inserts being so mounted on said shaft as to form cutting edges at an end of the shaft with work areas at least adjoining one another, the cutting inserts having their working cutting edges inclined to one another and including an inner most cutting insert substantially in a region of the axis of the drill and outwardly disposed cutting insert.

18. A drill for drilling solid materials as defined in claim 17 wherein the indented cutting edge for the innermost cutting insert has one of said cutting edges substantially parallel to the drill axis or inclined thereto at an angle of less than 10°.

19. The drill defined in claim 17 wherein in a region of each of said acute-angle cutting corners, the respective indented cutting edge is formed with a respective second cutting edge segment defining an angle greater than 90° with a respective first cutting edge segment of a respective jutting cutting edge, and defining an angle $\epsilon_3$ of 140° to 175° with an adjacent second cutting edge segment and comprising a notch formed in each of said indented cutting edges adjacent the respective acute-angle cutting corner, the notch of said innermost cutting insert lying at a region of said axis.

20. The drill defined in claim 17 wherein a rake face adjoining the active cutting edge of said outward cutting insert has an effective rake angle between 5° and 9°.

* * * * *